(12) United States Patent
Kaji et al.

(10) Patent No.: US 6,360,028 B1
(45) Date of Patent: *Mar. 19, 2002

(54) IMAGE PROCESSING APPARATUS AND METHOD

(75) Inventors: Hajime Kaji, Shizuoka-ken; Shigeo Fukuoka, Machida, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,993

(22) Filed: Dec. 24, 1997

(30) Foreign Application Priority Data

Dec. 27, 1996 (JP) .............................. 8-351215

(51) Int. Cl.⁷ .............................. G06K 9/32; H04N 1/04
(52) U.S. Cl. ........................ 382/296; 382/295; 358/488
(58) Field of Search ................................ 382/296, 297, 382/289, 301, 305, 307, 284, 291, 294, 295, 293; 358/488, 486, 1.16, 449, 450, 540

(56) References Cited

U.S. PATENT DOCUMENTS

| | | | | |
|---|---|---|---|---|
| 4,548,492 A | * | 10/1985 | Kanaoka et al. .............. 355/50 |
| 5,301,036 A | * | 4/1994 | Barrett et al. ................ 358/448 |
| 5,371,610 A | * | 12/1994 | Sugawa ....................... 358/434 |
| 5,461,459 A | * | 10/1995 | Muramatsu et al. ......... 355/203 |
| 5,485,245 A | * | 1/1996 | Kobayashi et al. .......... 355/202 |
| 5,579,419 A | * | 11/1996 | Yaguchi et al. ............. 382/305 |
| 5,625,466 A | * | 4/1997 | Nakajima .................... 358/449 |
| 5,627,650 A | * | 5/1997 | Nosaki et al. ............... 358/296 |
| 5,649,033 A | * | 7/1997 | Morikawa et al. .......... 382/297 |
| 5,867,279 A | * | 2/1999 | Funamizu et al. .......... 358/296 |
| 5,875,035 A | * | 2/1999 | Motosugi et al. ........... 358/296 |
| 5,999,767 A | * | 12/1999 | Ando .......................... 399/85 |
| 6,148,119 A | * | 11/2000 | Takaoka ...................... 382/289 |

* cited by examiner

Primary Examiner—Bhavesh Mehta
Assistant Examiner—Kanji Patel
(74) Attorney, Agent, or Firm—Fitzpatrick, Cella, Harper & Scinto

(57) ABSTRACT

Disclosed is an image forming apparatus capable of performing image formation by automatically discriminating and correcting the direction of an original without sorting originals including both portrait and landscape ones. Image data is read, and the direction of the read image is discriminated. In accordance with the discrimination result, a synthesis image to be synthesized suited to the direction of the image is selected. The synthesis image is rotated, where necessary, so that the synthesis image points in the same direction as the read image, and the two images having the same direction are synthesized and output.

21 Claims, 18 Drawing Sheets

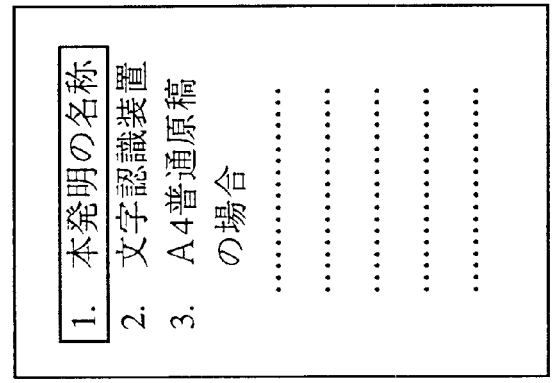
FIG. 7A
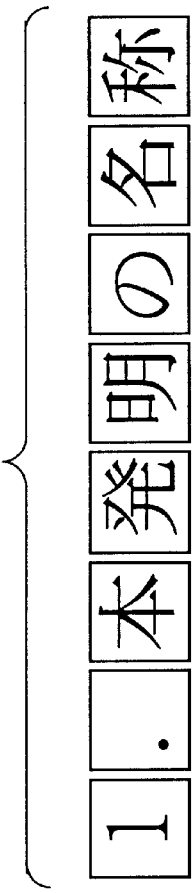
FIG. 7B
FIG. 7C
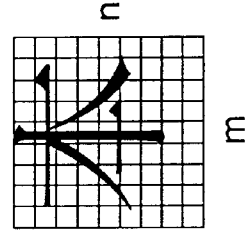
FIG. 7D

(rotated 90°)

FIG. 9

| 0° | 90° | 180° | 270° |
|---|---|---|---|
| 本 | 本 | 本 | 本 |

| RECOGNIZED CHARACTER | 本 | 町 | 克 | 式 |
|---|---|---|---|---|
| DEGREE OF CONFIDENCE | 0.90 | 0.40 | 0.30 | 0.50 |

F I G. 10A
F I G. 10B
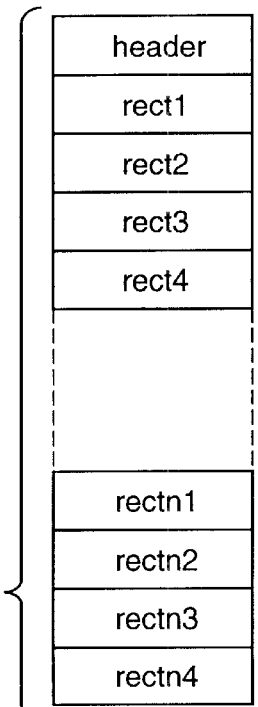
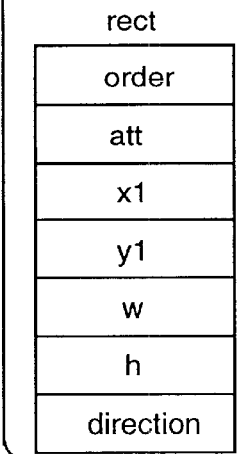
rect
F I G. 10C
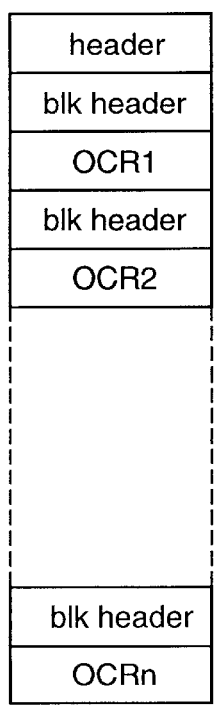
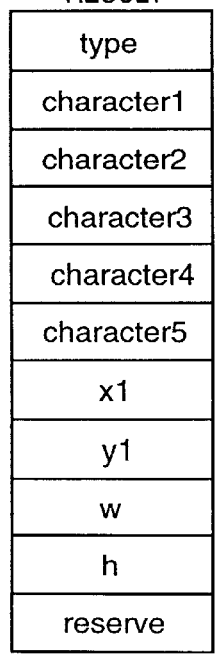
CHARACTER RECOGNITION RESULT

FIG. 12

| REPORT | DEPARTMENT NAME | DATE |
|---|---|---|
| | | |
| REMARKS | | |

FIG. 13

| REPORT | DEPARTMENT NAME | DATE |
|---|---|---|
| | | |
| REMARKS | | |

FIG. 18
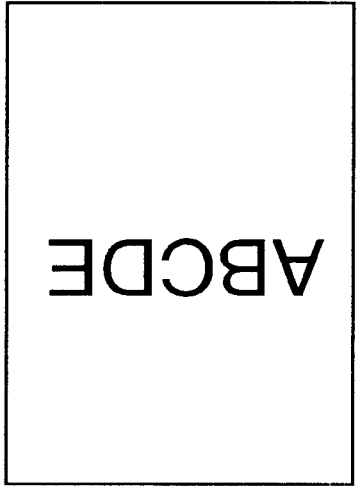
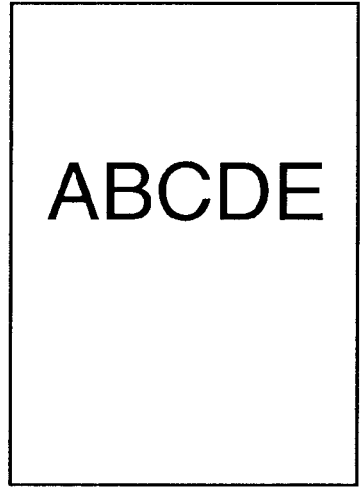
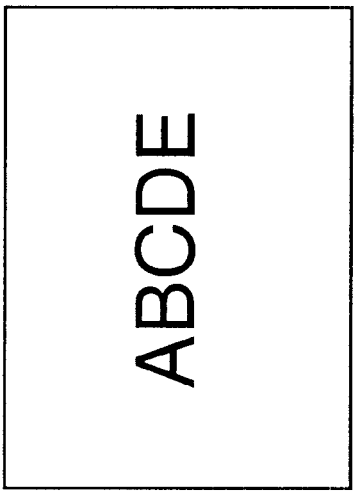
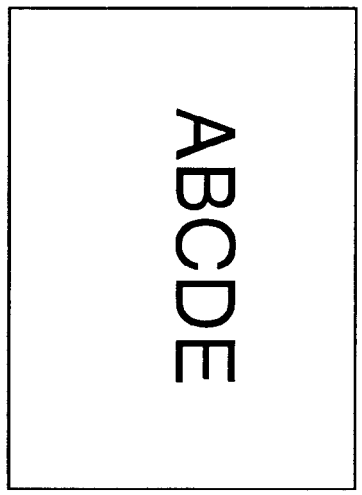

FIG. 19

| REPORT | DEPARTMENT NAME | DATE |
|---|---|---|
| | A B C D E | |
| REMARKS | | |

FIG. 20

| REPORT | DEPARTMENT NAME | DATE |
|---|---|---|
| | A B C D E | |
| REMARKS | | |

IMAGE PROCESSING APPARATUS AND METHOD

BACKGROUND OF THE INVENTION

1. Field of the Invention

The present invention relates to an image processing apparatus and an image processing method capable of performing image processing in accordance with the direction of image data.

2. Description of the Related Art

Conventional image processing apparatuses synthesize a plurality of image data by storing the image data in a hard magnetic disk unit (to be referred to as an "HD" hereinafter), synthesizing the data in an image processor, and outputting the synthesized data.

Also, a format (image data) which is often used is stored in, e.g., an HD or a magnetooptical disk, and image data obtained by reading an original and the stored format data are synthesized and output.

In the conventional image processing apparatuses, however, the direction of an original is not taken into consideration at all. Therefore, the user must take care to match the direction of an image to be synthesized with the direction of an image of an original.

For example, when a plurality of originals in both the portrait and landscape directions are to be output by separately synthesizing the portrait and landscape originals with portrait and landscape original formats, respectively, stored in a storage means, a user must sort the originals into the portrait and landscape ones and separately synthesize the portrait and landscape originals with their respective formats (synthesis image data). Additionally, if some originals do not point in the same direction, the user must set these originals in the same direction.

SUMMARY OF THE INVENTION

It is an object of the present invention to provide an image processing apparatus solving the above problems.

It is another object of the present invention to provide an image processing apparatus capable of synthesizing a plurality of portrait and landscape originals with format images without sorting these originals.

It is still another object of the present invention to provide an image processing apparatus capable of synthesizing an original with an appropriate format image regardless of whether the original is placed in the portrait direction or in the landscape direction.

The present invention has been made to achieve the above objects and has, for example, the following constitutions as means for achieving the objects.

An image processing apparatus of the present invention comprises storage means for prestoring a plurality of images, input means for inputting an image, discriminating means for discriminating a direction of the input image from the input means, selecting means for selecting one of the images stored in the storage means in accordance with the discrimination result from the discriminating means, and synthesizing means for synthesizing the input image from the input means and the image selected by the selecting means.

An image processing method of the present invention comprises the input step of inputting an image, the discrimination step of discriminating a direction of the image input in the input step, the selection step of selecting one of a plurality of images previously stored in storage means in accordance with the discrimination result in the discrimination step, and the synthesis step of synthesizing the image input in the input step and the image selected in the selection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 7A to 7D are views for explaining the process of the character recognition processing in this embodiment of the present invention;

FIGS. 8A and 8B are views for explaining the automatic image (character) direction discrimination processing in this embodiment of the present invention;

FIG. 9 is a view for explaining the automatic image (character) direction discrimination processing in this embodiment of the present invention;

FIGS. 10A to 10C are views for explaining region separation and the data format of character recognition information in this embodiment of the present invention;

FIG. 12 is a view showing an example of the portrait image data format in this embodiment of the present invention;

FIG. 13 is a view showing an example of the landscape image data format in this embodiment of the present invention;

FIG. 18 is a view for explaining character directions when originals are placed in the landscape direction in the second embodiment;

FIG. 19 is a view showing the result of synthesis with a portrait format image; and FIG. 20 is a view showing the result of synthesis with a landscape format image.

DETAILED DESCRIPTION OF THE PREFERRED EMBODIMENTS

Preferred embodiments of the present invention will be described in detail below with reference to the accompanying drawings.

First Embodiment

Figure 1:
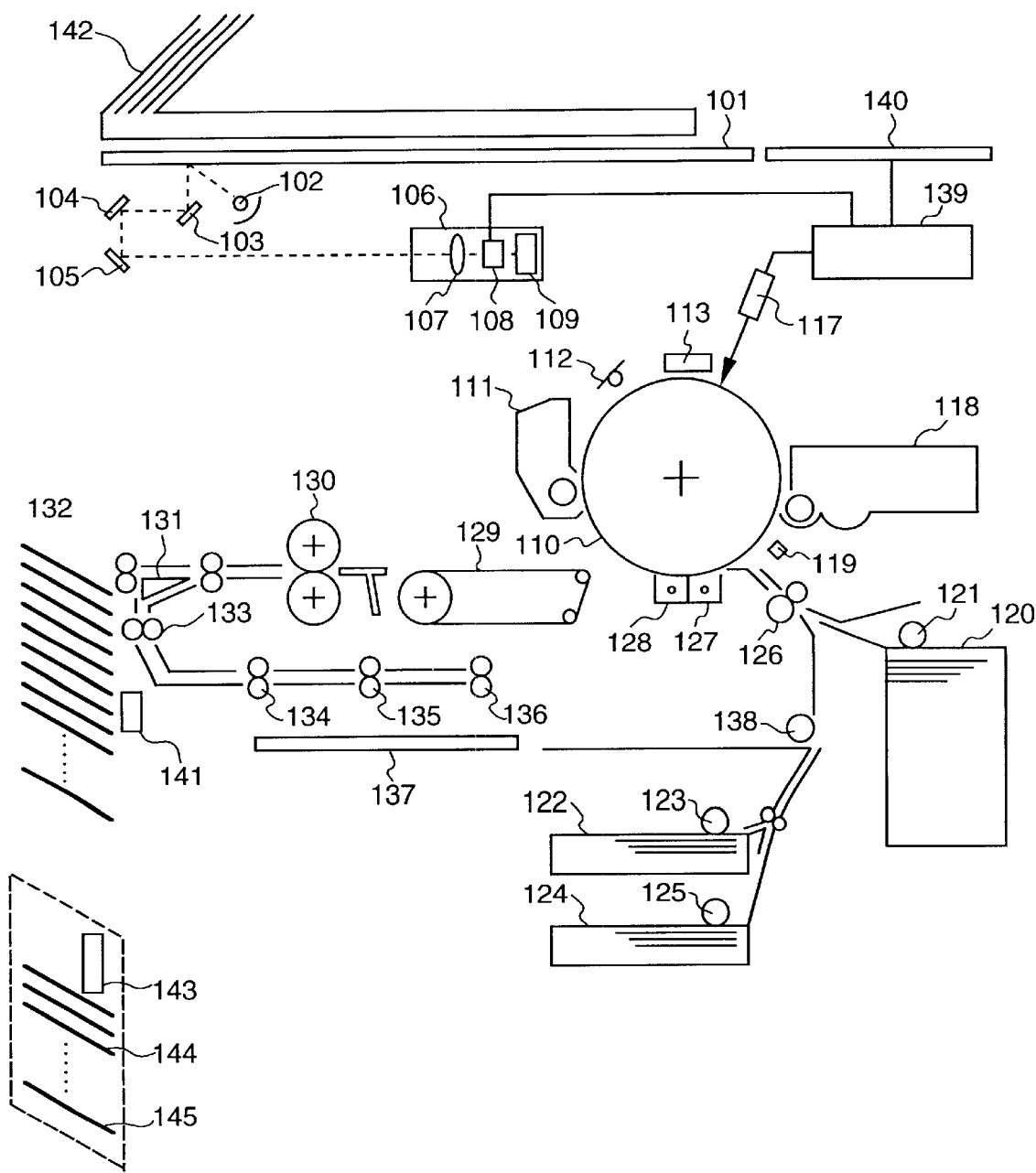
FIG. 1 is a sectional view for explaining the arrangement of an image processing apparatus according to the first embodiment of the present invention.

FIG. 1 is a sectional view for explaining the arrangement of an image processing apparatus according to the first embodiment of the present invention. In FIG. 1, reference numeral 101 denotes an original glass plate. Original fed from an auto document feeder (ADF) 142 is sequentially placed in a predetermined position of the original glass plate 101. An original illumination lamp 102 such as a halogen lamp exposes an original placed on the original glass plate 101.

Scanning mirrors 103, 104, and 105 are accommodated in an optical scanning unit (not shown) which moves back and forth to guide reflected light from the original to a CCD unit 106. The CCD unit 106 includes an image forming lens 107 for forming an image of the reflected light from the original on a CCD, an image sensing device 108 constituted by, e.g., a CCD, and a CCD driver 109 for driving the image sensing device 108.

An image signal output from the image sensing device 108 is converted into, e.g., 8-bit digital data and applied to a controller 139. A photosensitive drum 110 is charge-removed to prepare for image formation by a pre-exposure lamp 112. A primary charger 113 evenly charges the photosensitive drum 110.

An exposing means 117 is constituted by, e.g., a semiconductor laser. The exposing means 117 exposes the photosensitive drum 110 to form an electrostatic latent image on the basis of image data processed by the controller 139 for performing image processing and controlling the whole apparatus. A developing unit 118 contains black developer (toner). A pre-transfer charger 119 applies a high voltage before a toner image developed on the photosensitive drum 110 is transferred to a paper sheet.

In paper feed units 120, 122, and 124, paper feed rollers 121, 123, and 125, respectively, are driven to feed transfer sheets into the apparatus. These transfer sheets are temporarily stopped in a position where registration rollers 126 are disposed, and again fed in synchronism with the write of an image formed on the photosensitive drum 110. A transfer charger 127 transfers the toner image developed on the photosensitive drum 110 onto the transfer sheets.

A separation charger 128 separates the transfer sheets completely processed by the transfer operation from the photosensitive drum 110. Toner remaining on the photosensitive drum 110 without being transferred is collected by a cleaner 111. A conveyor belt 129 conveys the transfer sheets completely processed by the transfer process to a fixing unit 130 where the image is fixed by, e.g., heat.

A flapper 131 switches the conveyance path of the transfer sheets completely processed by the fixing process to a staple sorter 132 or an intermediate tray 137. Sheets discharged to the staple sorter 132 are sorted into bins, and a staple unit 141 staples the sorted sheets in accordance with instructions from the controller 139. Paper feed rollers 133 to 136 feed the transfer sheets once completely processed by the fixing process to the intermediate tray 137 by either reversing (multiple image formation) or not reversing (both-sided image formation) the sheets. A refeed roller 138 again conveys the transfer sheets placed on the intermediate tray 137 to the position where the registration rollers 126 are disposed.

The controller 139 includes, e.g., a microcomputer and an image processor (to be described later) and performs the image forming operation described above in accordance with instructions from an operation panel 140.

Figure 2:
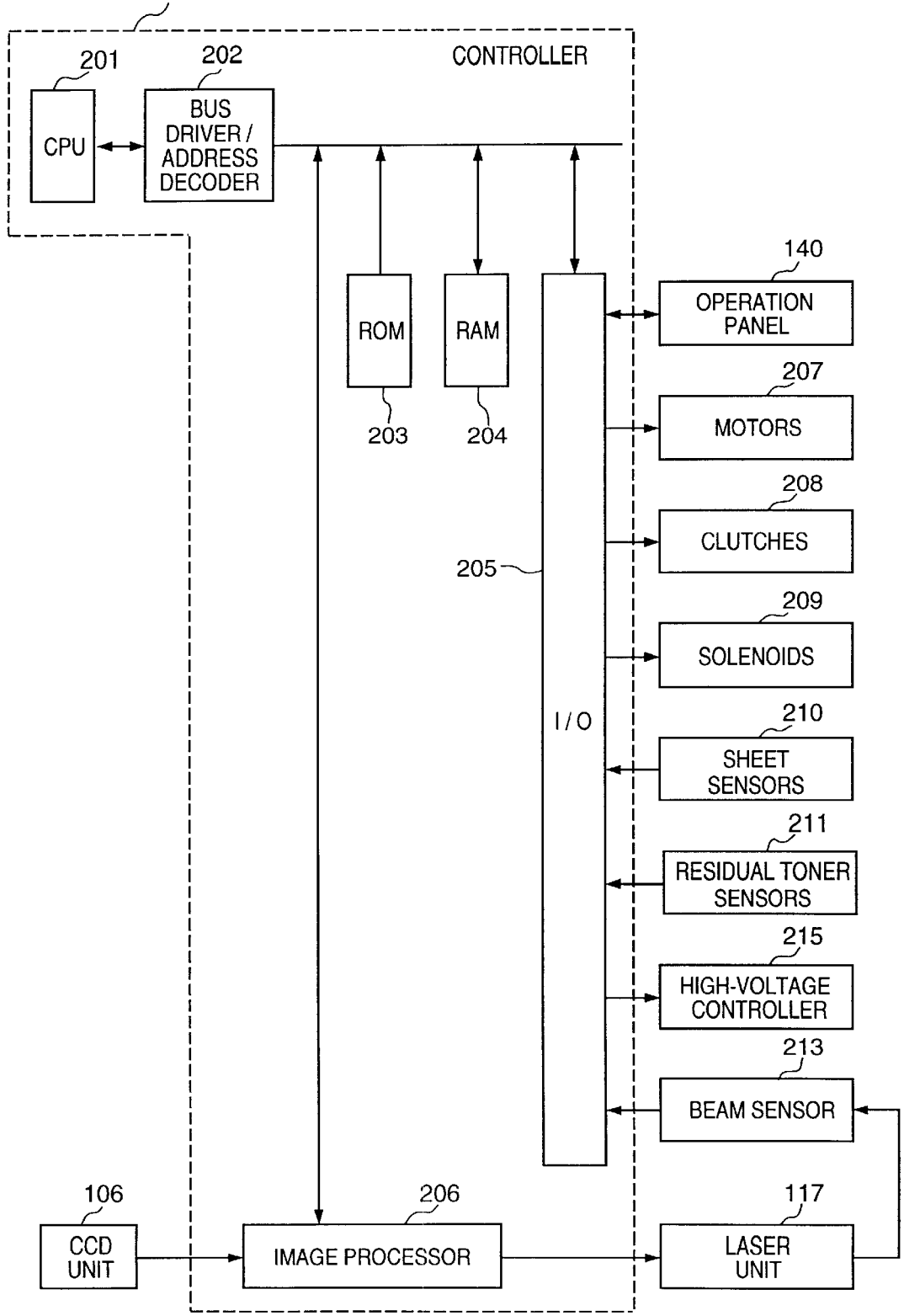
FIG. 2 is a detailed block diagram of a controller shown in FIG. 1.

FIG. 2 is a block diagram showing a detailed arrangement of the controller 139 in the image forming apparatus of this embodiment.

In FIG. 2, reference numeral 201 denotes a CPU for controlling the whole image processing apparatus. The CPU 201 sequentially reads out programs from a read-only memory 203 (ROM) storing control procedures (control programs) of the apparatus main body of this embodiment, and executes the readout programs. The address and data buses of the CPU 201 are connected to individual components via a bus driver/address decoder circuit 202.

A random access memory (RAM) 204 is a main storage used to store input data or as a working storage area. An I/O interface 205 interfaces with various I/O devices.

The I/O interface 205 is connected to the loads of devices such as the operation panel 140, motors 207, clutches 208, solenoids 209, and sheet sensors 210. The operation panel 140 allows an operator to perform key input operations and displays, e.g., the state of the apparatus by using a display unit such as a liquid crystal display or LEDs. The motors 207, the clutches 208, and the solenoids 209 drive the paper feed system, the conveyor system, and the optical system. The sheet sensors 210 sense the position of a conveyed sheet.

The developing unit 118 shown in FIG. 1 incorporates a residual toner sensor 211 for sensing the toner amount in the developing unit. A signal output from this residual toner sensor is applied to the I/O interface 205. A high-voltage control unit 215 outputs a high voltage to the primary charger 113, the developing unit 118, the pre-transfer charger 119, the transfer charger 127, and the separation charger 128 described above with reference to FIG. 1 in accordance with instructions from the CPU 201.

An image processor 206 receives an output image signal from the CCD unit 106, performs image processing (to be described later), and outputs a control signal to the laser unit 117 in accordance with the image data. An output laser beam from the laser unit 117 irradiates and exposes the photosensitive drum 110. The emission state of the laser beam is sensed in a non-image region by a beam sensor 213 as a light-receiving sensor. An output signal from the beam sensor 213 is applied to the I/O interface 205.

Figure 3:
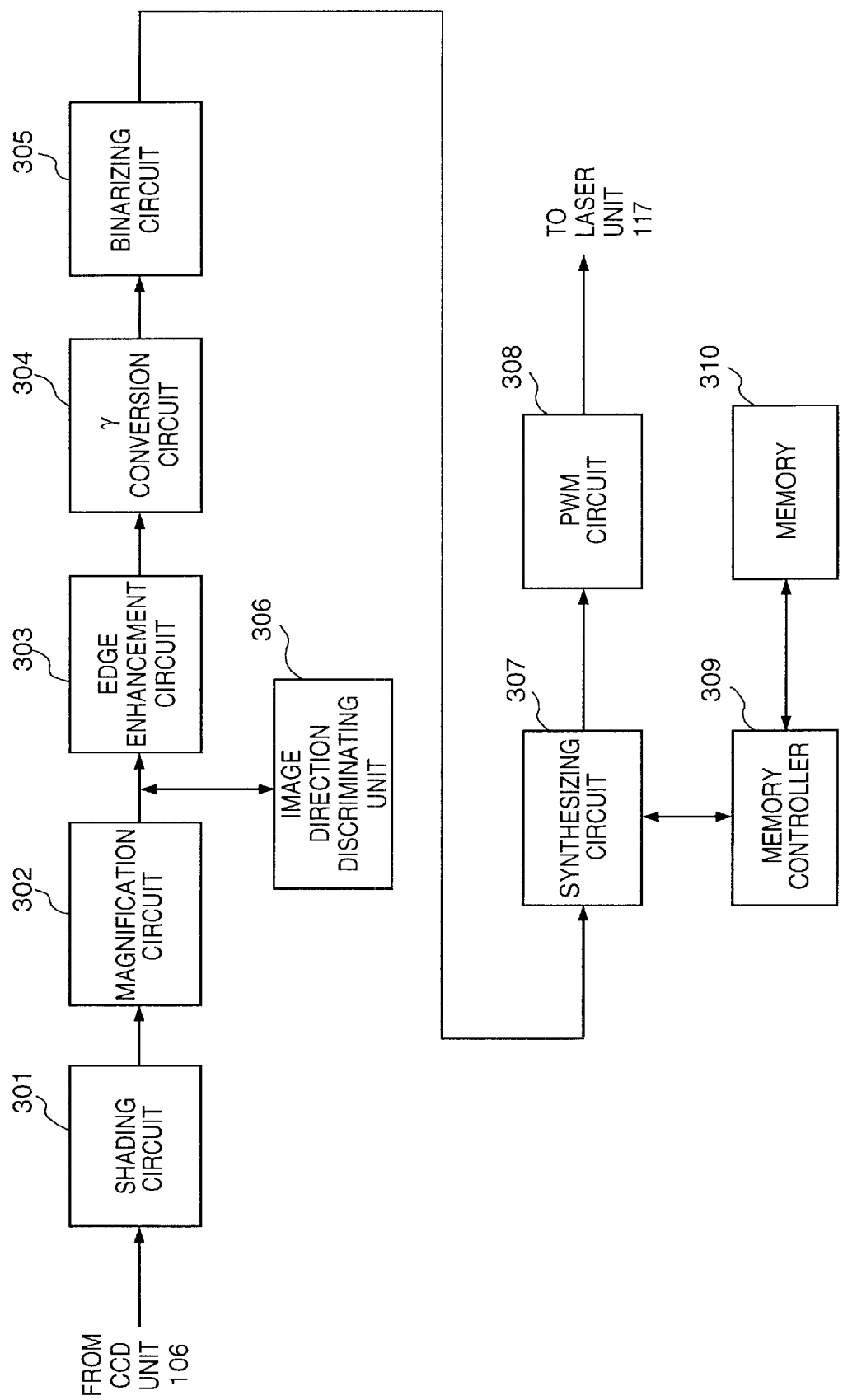
FIG. 3 is a detailed block diagram of an image processor in the controller shown in FIG. 2.

FIG. 3 is a detailed block diagram of the image processor 206 in the controller 139 of the image forming apparatus according to this embodiment of the present invention.

Referring to FIG. 3, an image signal converted into an electrical signal by the CCD 108 is first applied to a shading circuit 301 where variations between pixels are corrected. Thereafter, a magnification circuit 302 performs data decimation when reduced copying is to be performed and data interpolation when enlarged copying is to be performed.

Subsequently, an edge enhancement circuit 303 enhances the edge of the image by calculating the second derivative using, e.g., a 5×5 window. Since this image data is brightness data, the data must be converted into density data before being output to a printer. Therefore, a γ conversion circuit 304 performs data conversion by table search.

The image data converted into density data is applied to a binarizing circuit 305 where multi-value data is converted into binary data by, e.g., the ED method. The binary image data is applied to a synthesizing circuit 307. The synthesizing circuit 307 selectively outputs the input image data or image data stored in an image memory 310 constituted by, e.g., a hard disk unit, or outputs the OR of the two image data.

A memory controller 309 performs read/write control for the image memory 310. To rotate an image, the memory controller 309 controls the read address of image data in the memory 310. The image data is applied to a PWM circuit 308 where the data is converted into a signal representing a laser emission intensity, and output to the laser unit as a laser drive signal with a pulse width corresponding to the density of the image. An image output from the magnification circuit 302 is applied to an image direction discriminating unit 306 and subjected to image direction discrimination processing described below.

The image direction discrimination processing in this embodiment of the present invention will be described below with reference to FIGS. 4 to 9.

Figure 4:
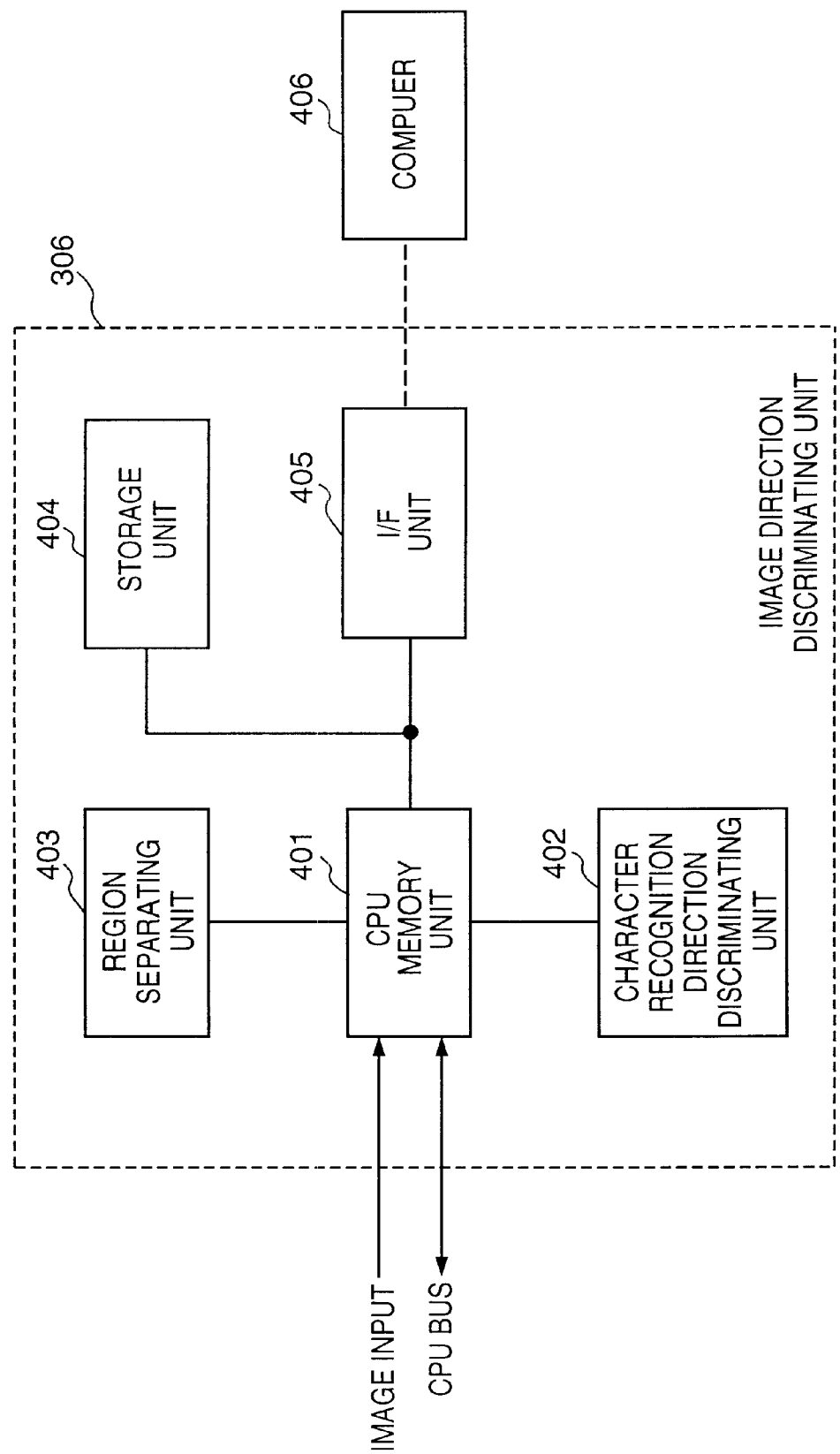
FIG. 4 is a detailed block diagram of an image direction discriminating unit shown in FIG. 3.

FIG. 4 is a detailed block diagram of the image direction discriminating unit 306 for discriminating image direction by discriminating the character direction in an original image.

Output image data from the magnification circuit 302 is applied to a CPU/memory unit 401 of the image direction discriminating unit 306 which temporarily stores the image data and performs various control operations. The CPU/memory unit 401 is connected to the CPU 201 in the controller 139 through a bus by a dual port RAM (not shown) and exchanges data. It is of course also possible to exchange serial communication data.

Since data components most accurately representing the direction of an image are characters, a character recognizing/direction discriminating unit 402 performs character recognition for several different character regions in a document in directions of 0°, 90°, 180°, and 270°. Of these directions, the character recognizing/direction discriminating unit 402 sets a direction having the highest character recognition accuracy (the degree of confidence of character recognition: the distance to a character feature distribution) as the image direction.

A region separating unit 403 is a block for performing processing of dividing a character part, a graphic part, a natural image part, and a table part of document image data into rectangular regions and adding an attribute (e.g., a character part) to each region, as pre-processing for allowing the character recognizing/direction discriminating unit 402 to perform the character recognition direction discrimination processing.

A storage unit 404 is constituted by, e.g., an HD or a magnetooptical disk unit and used to store various processing results (e.g., image data, region separation results, and character recognition results). An I/F unit 405 is constituted by, e.g., SCSI or RS232C and used to transmit data to external devices. A computer 406 acquires information via the I/F unit 405 and also acquires data from another storage unit such as a magnetooptical disk.

An outline of the automatic image direction discrimination correction and the character recognition processing performed by the character recognizing/direction discriminating unit 402 in this embodiment of the present invention with the above arrangement will be described below with reference to the flow chart in FIG. 5.

Image data (multi-value) applied to the CPU/memory unit 401 of the character recognizing/direction discriminating unit 402 in step S1 is transferred to the region separating unit 403 in step S2. The region separating unit 403 separates the image data into rectangular regions in accordance with attributes such as a character part, a graphic part, a natural image part, and a table part. In effect, the region separating unit 403 forms region information surrounded by rectangles.

Figure 6A:
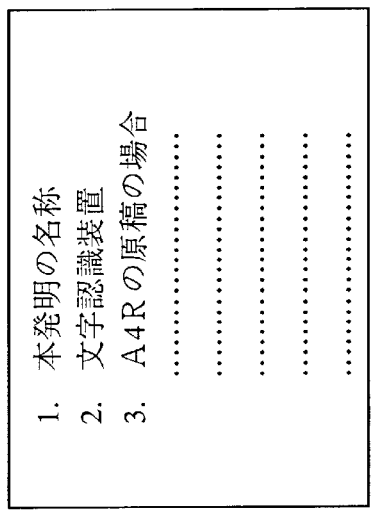
FIGS. 6A to 6D are views showing region separation in the automatic image direction discrimination in this embodiment of the present invention.
Figure 6B:
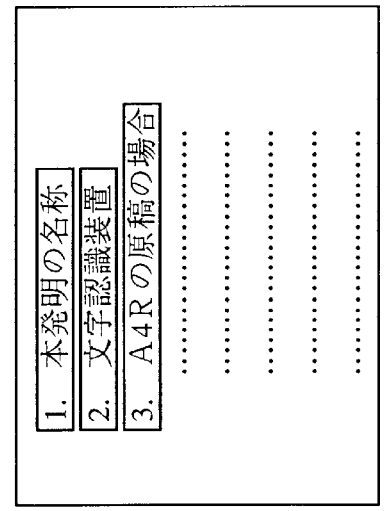
Figure 6C:
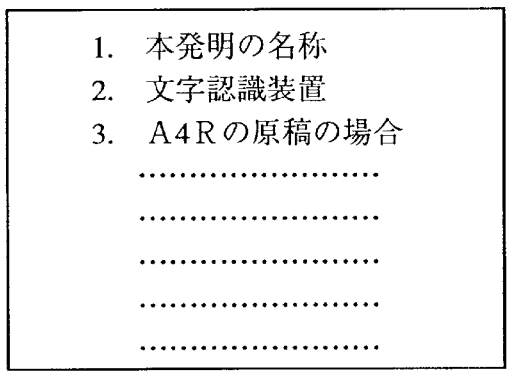
Figure 6D:
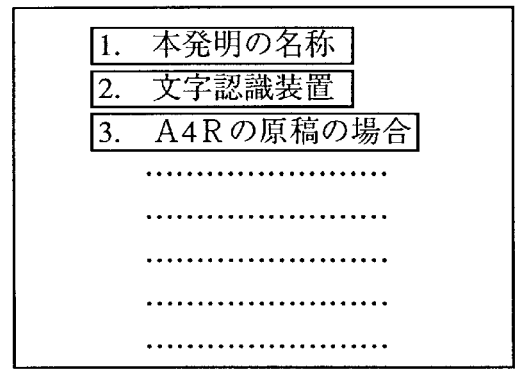

In step S3, the rectangular information of character regions is extracted in accordance with the attributes. Character regions herein mentioned are a composition part, a title part, characters in a table, and the caption of a figure. In the case of documents shown in FIGS. 6A and 6C, for example, the rectangular information of character regions as shown in FIGS. 6B and 6D, respectively, are extracted.

In step S4, image direction discrimination is performed by using several blocks in the regions extracted in step S3. If the image direction is found to be the regular direction as a result of the image direction discrimination in step S4, the flow advances to step S7, and character recognition processing is performed for character blocks in the images in the regions extracted in step S3.

On the other hand, if the image direction is not the regular direction in step S4, the flow advances to step S5, and the input image is rotated so that the image data points in the regular direction. In step S6, the image rotated in step S5 is separated into regions, and correction processing is performed for the region separation information. This processing corrects the difference between region separation information resulting from image rotation. One method is to again perform region separation processing for the entire rotated image data. Another method is to perform address conversion for the region separation result. Since region separation processing is generally done by assuming that the image points in the regular direction, region separation processing performed in the initial stages and region separation processing performed for rotated image data often have different results. Accordingly, the use of the former method is desirable. The flow then advances to step S7, and the character recognition processing system performs character recognition for character region blocks in the rotated image data.

In step S7, the character recognition is performed for all character regions. In step S8, region separation information and character recognition information are finally obtained for both cases of no rotation/to be rotated as a result of the character recognition in step S7. This processing result is transmitted to the computer 406 via the I/F unit 405 and used by, e.g., filing application software on the computer 406. The data is also transmitted in units of images to the CPU 201 in the controller 139.

A practical method of image direction discrimination using the above character recognition processing will be described in more detail below.

[Region separation processing]

In the region separation processing in step S2, black pixels in document image data are detected, and a rectangular frame of a black pixel block is formed by contour line tracking or labeling. Subsequently, on the basis of, e.g., the black pixel density in the rectangle, the presence/absence of an adjacent rectangular block, or the aspect ratio of the rectangle, a character region (a title, a composition, or a caption), a graphic region, a natural image region, or a table region is discriminated. From this processing result, a rectangular region of a character region is discriminated.

[Character region rectangular information extraction processing]

Feature vector extraction/comparison is one method of extracting rectangular information of a character region in step S3. For example, assume that a character region including a character "本" shown in FIG. 7A is discriminated in step S2. In the first stage, character separating processing is performed for this character region. FIG. 7B shows the result of this separating processing. In this processing, a rectangle of one character is separated by detecting black pixel continuity.

In the second stage, the separated character is divided into m×n (e.g., 64×64) pixel blocks. FIG. 7C shows an example of this division. The distribution direction of black pixels is extracted from the divided pixels by using a window of a predetermined size, e.g., a window of 3×3 pixels. This is direction vector information, examples of which are shown in FIG. 7D.

Note that FIG. 7D shows portions of the direction vector information. In effect, several tens of pieces of direction vector information are obtained by shifting the window of 3×3 pixels. This vector information is the feature of the character. This feature vector is compared with the contents of a previously stored character recognition dictionary, and characters are extracted in order from one whose feature is closest to the feature vector. The extracted characters are the first candidate, the second candidate, and so on in order from the one whose feature is closest to the feature vector. The closeness of a feature to the feature vector is a numerical value representing the distance to that character, i.e., the degree of confidence (accuracy) of character recognition.

[Character direction discrimination processing]

The degree of confidence of the extracted character is obtained as above. The character direction discrimination processing in step S4 based on this degree of confidence will be explained below by taking a sentence "本発明の名称" shown in FIGS. 8A and 8B as an example.

FIG. 8A shows a case in which the sentence "本発明の名称" is in the regular direction. FIG. 8B shows a case in which the sentence "本発明の名称" is rotated 270°. The first character "本" of this sentence is considered. In discriminating character direction by using a Kanji character "本", as shown in FIG. 9, character recognition is performed for the Kanji character "本" in four directions of 0°, 90°, 180°, and 270°. To obtain each rotational angle it is only necessary to change the way the character rectangular region is read out; it is not particularly necessary to rotate the original.

As shown in FIG. 9, temporary character recognition results for explanation at the individual rotational angles are different from each other. FIG. 9 shows the degree of confidence for each temporary character recognition result for explanation shown in FIG. 9. Note that these values are not always obtained in practice.

As shown in FIG. 9, when character recognition is performed in the regular direction (0°), the character is correctly recognized as the character "本" and the degree of confidence is also as high as 0.90. When character recognition is performed in a direction rotated 90°, the character is erroneously recognized as a character "町", and the degree of confidence lowers to 0.40. A recognition error occurs and the degree of confidence drops as described above because the character recognition is performed on the basis of a feature vector when the character is viewed in the rotated direction. Analogously, when character recognition is performed in directions rotated 180° and 270°, recognition errors occur and the degree of confidence suffers. Note that the difference between the degrees of confidence of direction discrimination obtained by character recognition in different directions increases as the complexity of the character increases.

In the results shown in FIG. 9, the degree of confidence is highest when recognition is done in the regular direction.

Therefore, it is determined that the possibility of the document pointing in the regular direction is high. To improve the accuracy of character direction discrimination, character recognition is similarly performed in the four directions for a plurality of characters in the same block. Additionally, if the character direction is discriminated only in one block, the character direction of a special character string may be erroneously discriminated. Therefore, similar character recognition is performed for a plurality of blocks. The average value of the degrees of confidence in the four directions of each recognition object character in each block is calculated. Also, the average value of the average values of the degrees of confidence in the four directions in each block is calculated. A direction in which this average value is largest is found to be the character image direction.

As described above, the character direction is not found by the degree of confidence of only one character, i.e., the character direction is found by the degrees of confidence of a plurality of characters in the same block and by the degrees of confidence in a plurality of blocks. Consequently, the character (image) direction can be discriminated with high accuracy. However, the character image direction can naturally be discriminated with higher accuracy than in conventional methods by discriminating the character image direction by the degree of confidence of only one character or by the degrees of confidence of a plurality of characters in the same block.

If it is determined that the character image direction is not the regular direction, the flow advances to the processing in step S5 to rotate the original image such that the character image direction points in the regular direction. This rotation can be performed in accordance with a conventional method by using the CPU/memory 401 shown in FIG. 4, and a detailed description thereof will be omitted.

By the processing as described above, region separation data as shown in FIG. 10B can be obtained from original image data shown in FIG. 10A. Additionally, character recognition information shown in FIG. 10C can be obtained from the region separation data. As described previously, these pieces of information are supplied to the CPU 201 of the controller 139 and used in various image processing and control operations.

The format of the region separation data in this embodiment of the present invention is that of the data shown in FIG. 10B and includes "header" indicating that the data is region separation data and identifiers "rect1" to "rect4" of separated regions. The information of a region (block) identified by this identifier includes a number "order" of a block, an attribute (e.g., a character part or a graphic part) "att" of the block, coordinates "x1" and "y1" of the upper left point of the block, a width "w" of the block, a height "h" of the block, "direction" indicating vertical writing or horizontal writing, an ID "selfID" of the block, an ID "upperID" of a parent block including the block, an attribute "upperAtt" of the parent block, and a reserve region "reserve".

The format of the character recognition information is the one shown in FIG. 10C. This format has "header" indicating that the information is character recognition information and the combination of character recognition information, e.g., "OCR1" relating to a single character such as " " and "blkheader", corresponding to "rect1" described above, which indicates a block containing the character.

Each character recognition information, e.g., "OCR1" includes "type" indicating whether the data is a character or blank, first to fifth candidate characters "character1" to "character5" corresponding to the degrees of confidence of character recognition described previously, a width "w" of the character, a height "h" of the character, and a reserve region "reserve".

Image synthesis/output processing of this embodiment of the present invention including the processing explained above will be described below with reference to the flow chart in FIG. 11.

In step S11, the image forming apparatus of this embodiment of the present invention clears flags W, X, Y, and Z corresponding to image direction results to 0. In step S12, the apparatus checks whether the copy key on the operation panel 140 is depressed to activate copy processing, and waits until the copy key is depressed.

Figure 14:
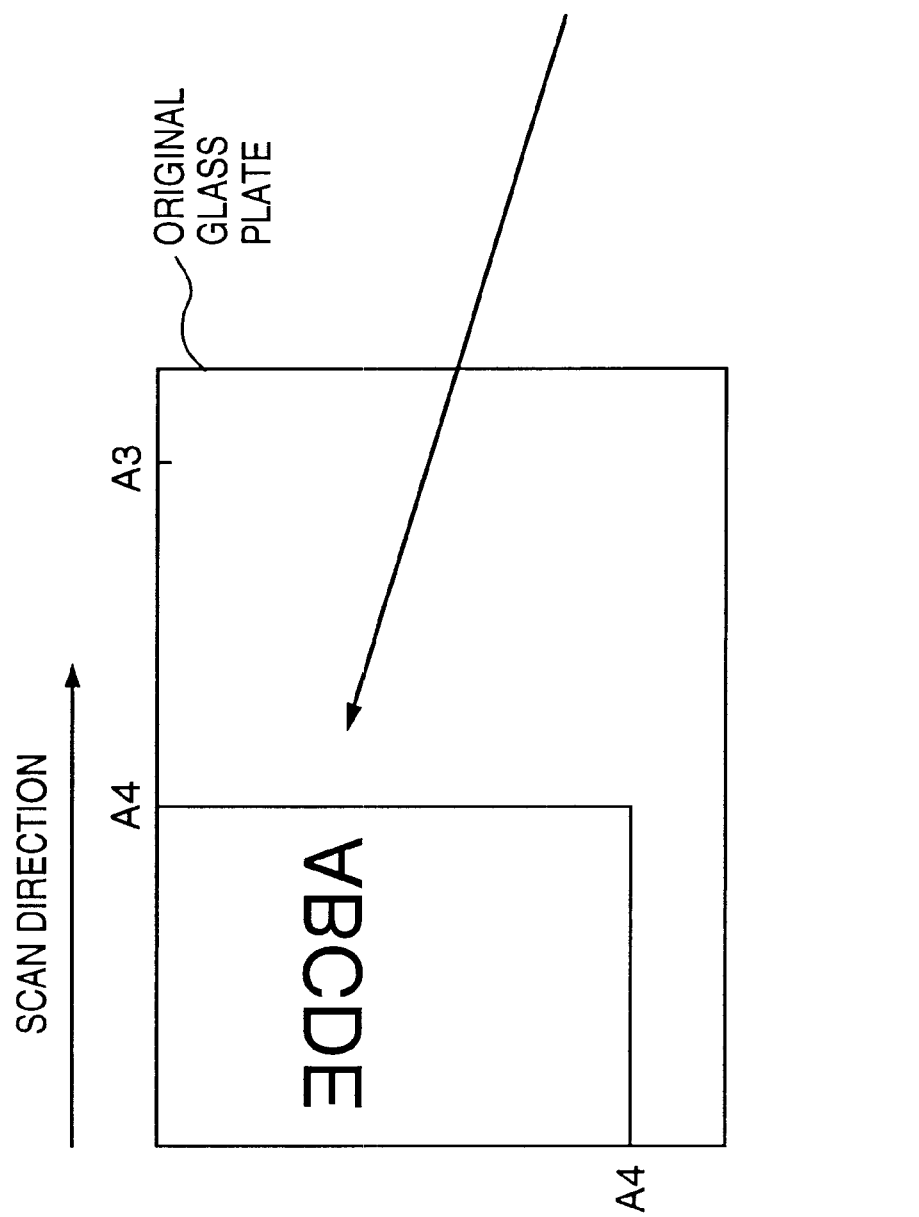
FIG. 14 is a view showing the reference direction (regular direction) of original direction detection in this embodiment of the present invention.

If the copy key is depressed in step S12, the flow advances to step S13 to execute image read processing of sequentially feeding originals set in the auto document feeder onto the original glass plate 101 and reading these originals. The flow then advances to step S14 to perform the image direction discrimination processing described above for the image data read (input) in step S13, thereby discriminating the image direction (the direction in which the original is placed). For example, the direction of image data obtained by reading an original placed in a direction shown in FIG. 14 is set as the regular direction, and it is checked whether input image data points in any direction of 0°, 90°, 180°, and 270° shown in FIG. 15 with respect to the regular direction.

If it is determined in step S14 that the image direction is 0°, the flow advances to step S15 to set 1 in W and then advances to step S19. If the direction is 90°, the flow advances to step S16 to set 1 in X and then advances to step S19. If the direction is 180°, the flow advances to step S17 to set 1 in Y and then advances to step S19. If the direction is 270°, the flow advances to step S18 to set 1 in Z and then advances to step S19.

When the original direction is completely set as above, synthesis image selection processing is executed in step S19. Synthesis images are stored in a storage means (e.g., an HD). Of the image data stored in this storage means, image data (to be synthesized with an input image) suited to the discriminated image direction is selected.

In this embodiment of the present invention as described above, the direction shown in FIG. 14 is set as the regular direction. Therefore, if the direction is 0° (W=1) or 180° (Y=1), it is determined that portrait original image data (format) shown in FIG. 12 is suitable, so this portrait original image data is selected. If the original direction of the selected synthesis image is 0° or 180°, the flow advances to step S20. If the original direction of the selected synthesis image is 90° or 270°, the flow advances to step S23.

In step S20, it is checked whether the direction (original direction) of the input image data is suited (is not rotated 180°) to the synthesis image data (format). Assume that the regular direction of the portrait original image data is W=1. If the input image data is rotated 180° (Y=1) with respect to this regular direction, the flow advances to step S21 to read out the synthesis image data (format) from the storage means so that the data can be synthesized in a direction suited to the direction of the input image data.

On the other hand, if it is determined in step S20 that the direction (original direction) of the input image data is suited to the direction of the synthesis image data (format), the flow advances to step S22.

In step S22, the input image data and the readout synthesis image data (format) which is rotated where necessary are synthesized, and the flow advances to step S26. In step S26, the synthesized image data is formed into an image. In step S27, it is checked whether all images to be formed have been completely formed. If all images to be formed have not been completely formed, the flow returns to step S13 to perform the next image formation processing. If all images to be formed have been completely formed, the processing ends.

On the other hand, if the image direction of the synthesis image selected in step S19 is 90° (X=1) or 270° (Z=1), it is determined that landscape original image data (format) shown in FIG. 13 is suitable, and the flow advances to step S23. In step S23, as in step S20, it is checked whether the input image data is suited to the direction of the synthesis image data (format).

Assume that the regular direction of the landscape original image data (format) is X=1. If the input image data is rotated 180° (Z=1) with respect to this regular direction, the flow advances to step S24 to read out the synthesis image data (format) from the storage means so that the data can be synthesized in a direction suited to the direction of the input image data. The flow then advances to step S25. In step S25, the rotated image is synthesized, and the flow advances to step S26.

On the other hand, if it is determined in step S23 that the direction of the input image data is suited to the direction of the synthesis image data (format), the flow directly advances to step S25 to normally read out the synthesis image data (format) from the storage means and synthesize the readout data. The flow then advances to step S26.

In this embodiment of the present invention as described above, the direction of an original can be automatically discriminated and corrected. Accordingly, image formation can be performed without sorting portrait and landscape originals. Also, image formation can be performed without setting originals in the same direction. Therefore, even in copying a plurality of originals including both originals to be synthesized on a portrait image data format and originals to be synthesized on a landscape image data format, a user can copy these originals without setting each original in the corresponding direction. Furthermore, even when different types of originals are to be copied, it is unnecessary to perform image synthesis by setting different conditions for different originals. Consequently, a readily usable image forming apparatus can be provided.

Second Embodiment

Figure 17:
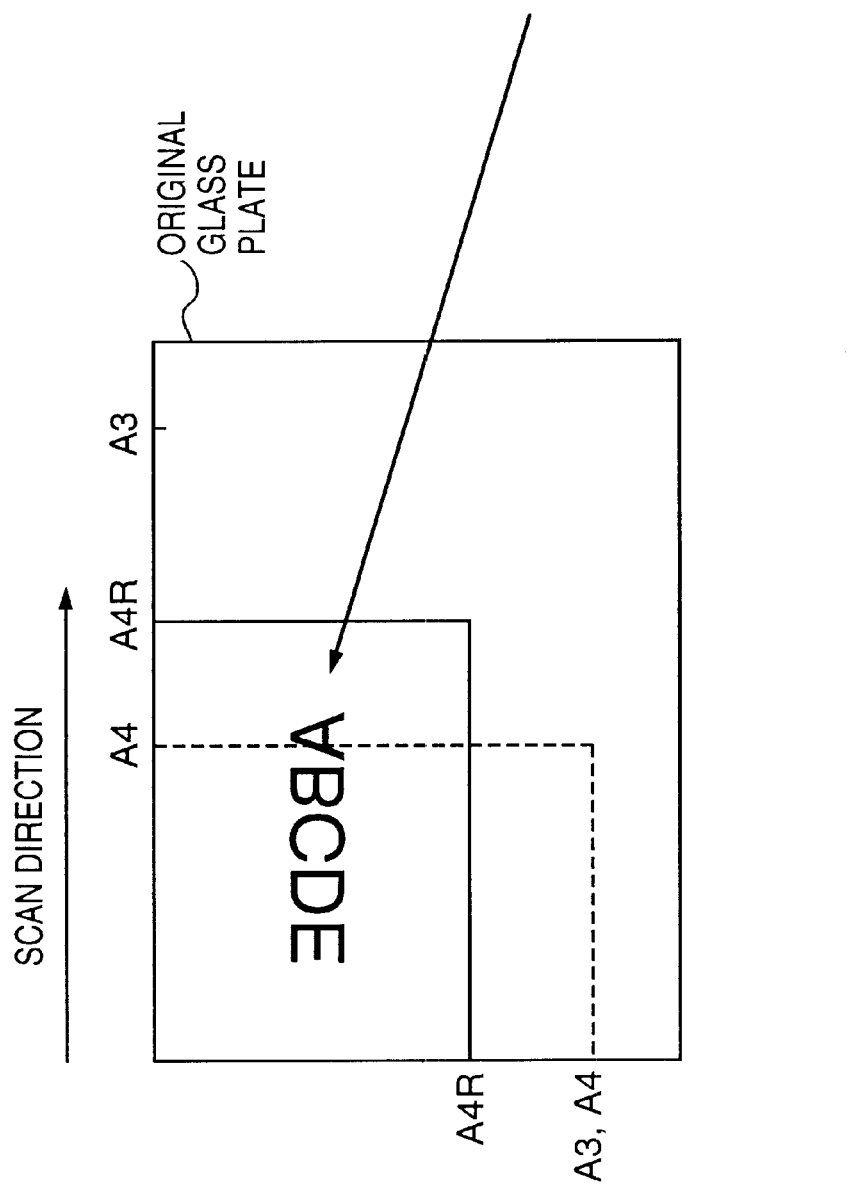
FIG. 17 is a view showing a case in which an original is placed in the landscape direction in the second embodiment.

In the above embodiment, the image direction is discriminated by discriminating the character direction in an original image, and a format image is selected in accordance only with the discriminated image direction. In this processing, it is more preferable to take account of the sheet direction of an original such as A4 or A4R. That is, an original is placed on an original glass plate 101 not only in the portrait direction as shown in FIG. 14 but also in the landscape direction as shown in FIG. 17. Assume that as in the above embodiment, at least two types of format images, i.e., the portrait format image shown in FIG. 12 and the landscape format image shown in FIG. 13 are prepared and stored in the portrait direction in a memory 310.

Figure 15:
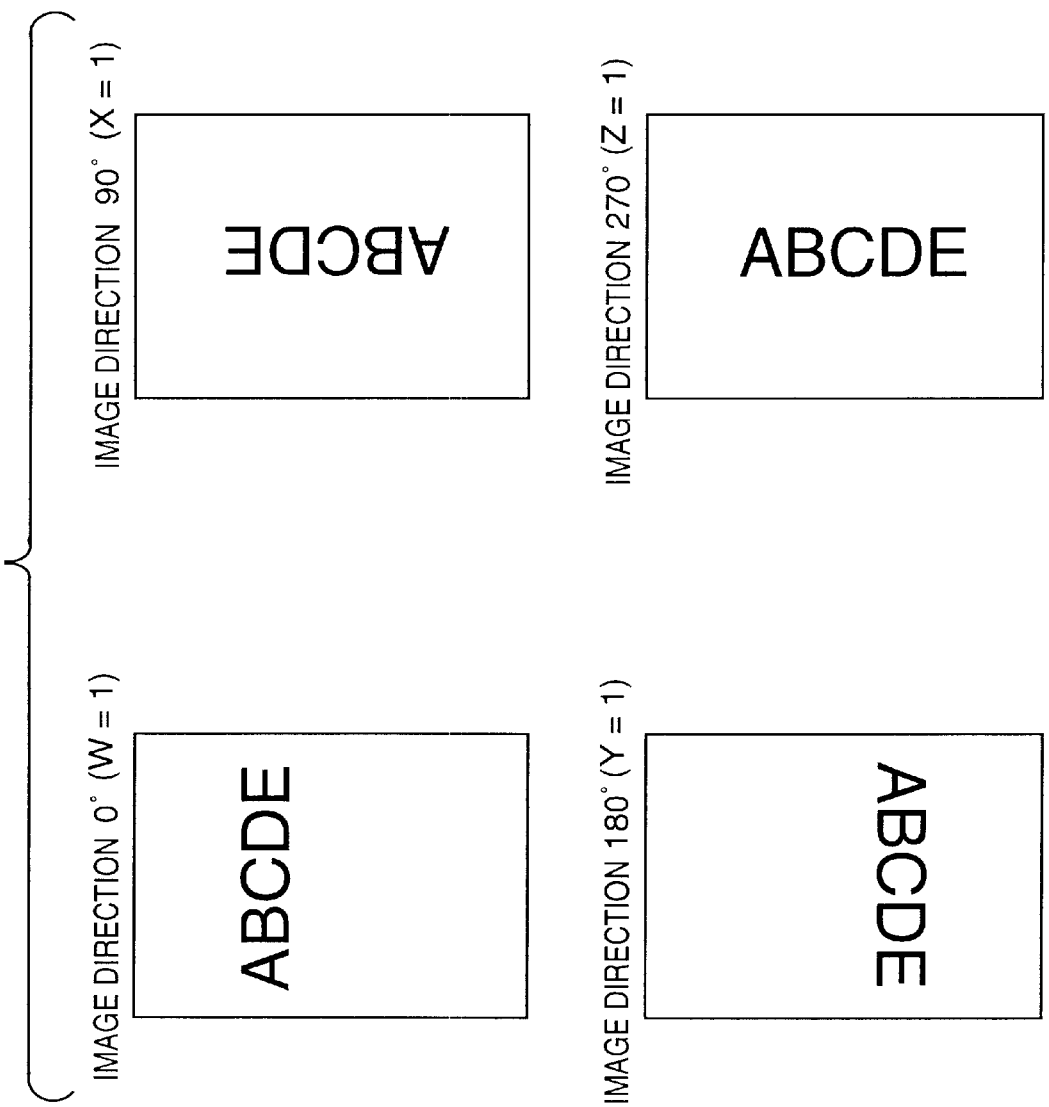
FIG. 15 is a view for explaining direction detection in the reference direction in this embodiment of the present invention.

Consequently, a portrait format image or a landscape format image is selected for a total of eight directions, i.e., four directions in original images set in the portrait direction as shown in FIG. 15 plus four directions in original images set in the landscape direction as shown in FIG. 18.

Figure 16A:
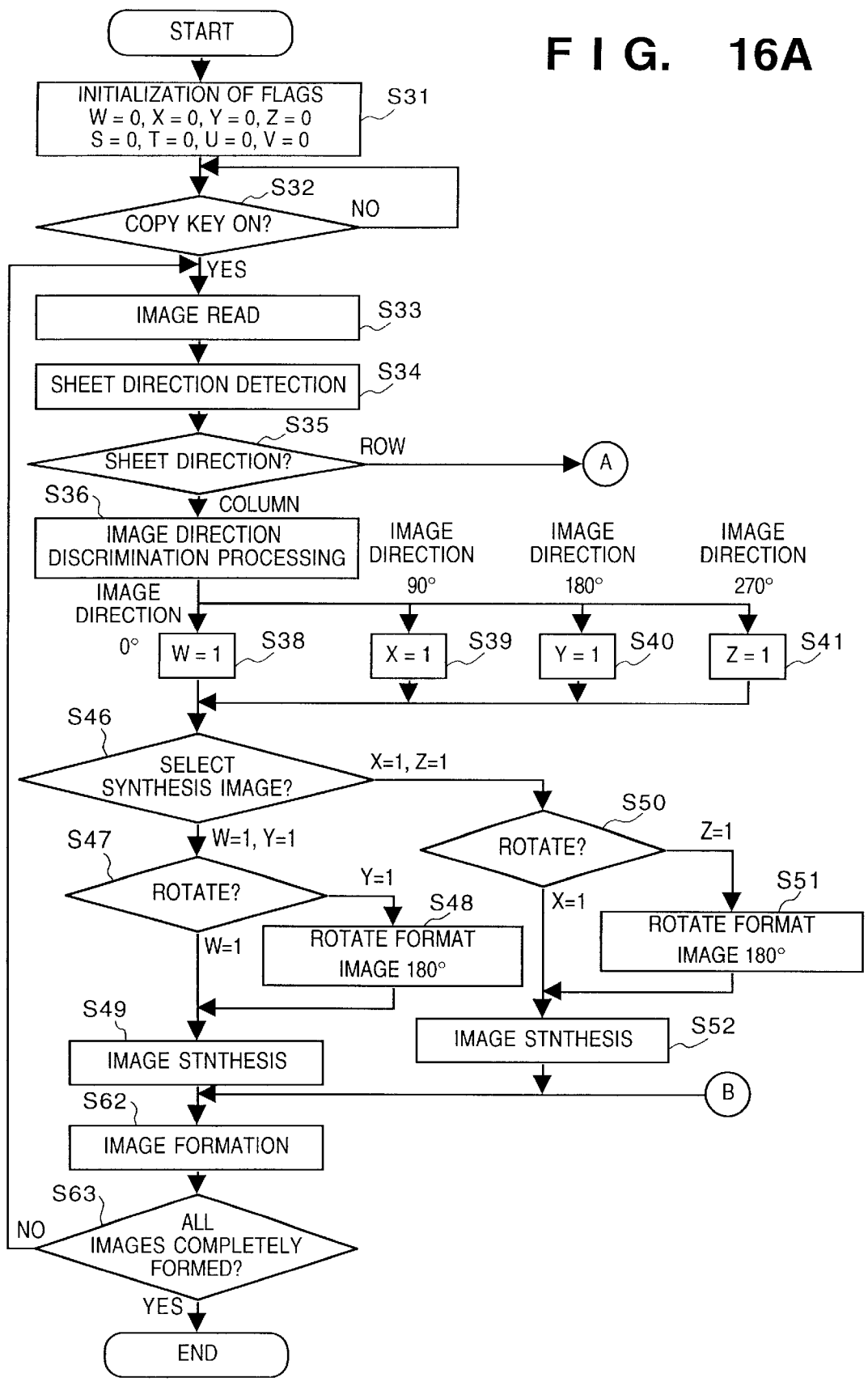
FIGS. 16A and 16B are flow charts showing image synthesis/output processing in the second embodiment.
Figure 16B:
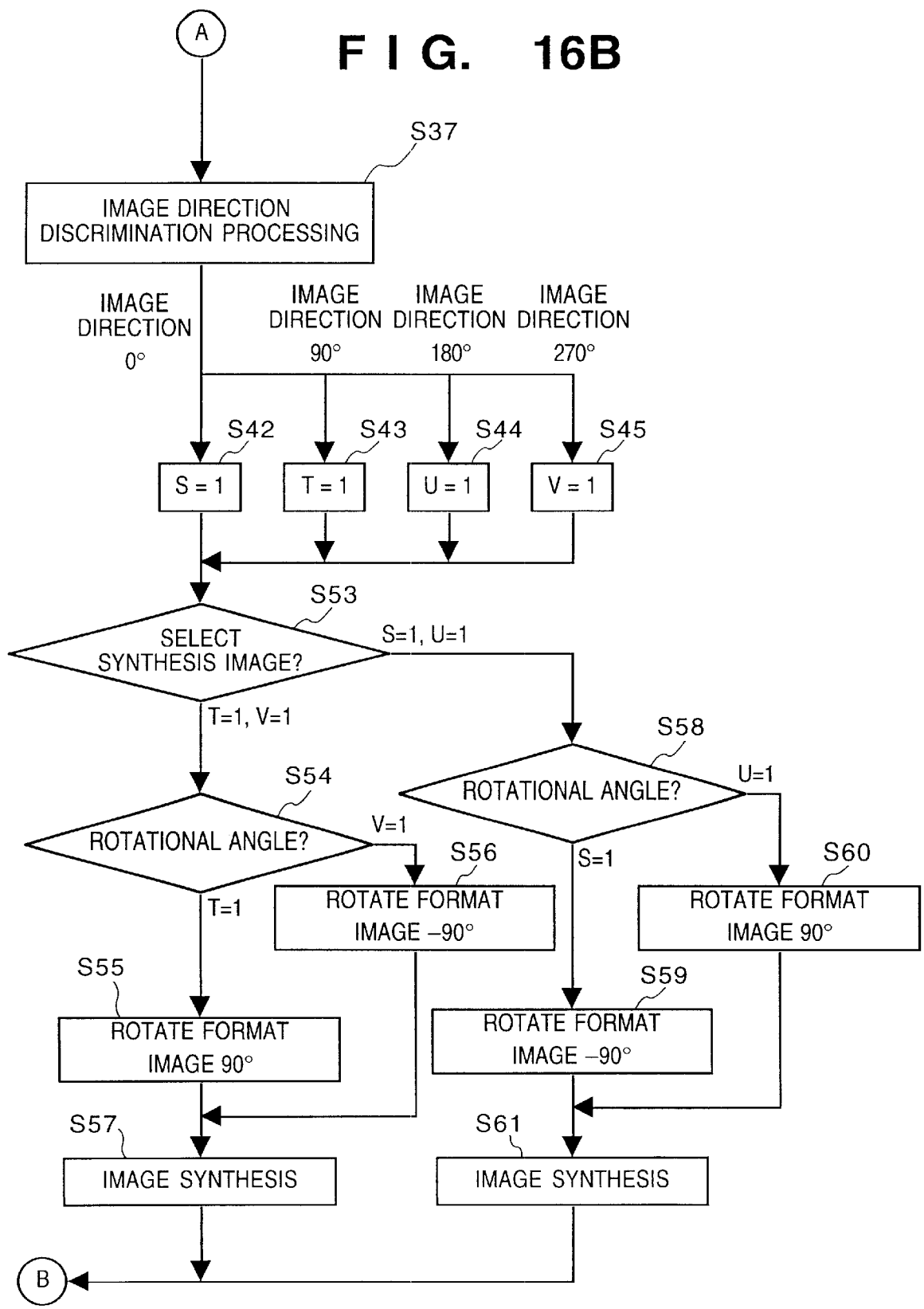

The flow of the operation will be described in detail below with reference to FIG. 16A and 16B.

In step S31, flags W, X, Y, Z, S, T, U, and V corresponding to individual direction results are cleared to 0. In step S32, it is checked whether the copy key on the operation panel 140 is depressed to activate copy processing, and the apparatus waits until the copy key is depressed.

If the copy key is depressed in step S32, the flow advances to step S33 to execute image read processing of sequentially feeding originals set in the automatic document feeder 142 onto the original glass plate 101 and reading these originals.

In step S34, the sheet direction of the original is sensed. That is, a sensor (not shown) provided in the auto document feeder 142 senses the vertical and horizontal dimensions of the sheet when the original is conveyed to the original glass plate 101, thereby discriminating the sheet direction. Alternatively, a sensor (not shown) provided below the original glass plate 101 senses the vertical and horizontal dimensions to discriminate the sheet direction. In step S35, the sheet direction is checked in accordance with the discrimination result in step S34. The flow advances to step S36 if the sheet direction is the portrait direction such as A4 or to step S37 if the sheet direction is the landscape direction such as A4R.

In step S36 or S37, the character direction of the image data read in step S33 is discriminated by the image direction discrimination processing described above. That is, the direction of the original is classified into one of the eight types of directions shown in FIGS. 15 and 18 in accordance with the character direction and the sheet direction. In one of steps S38 to S45, one of the flags W, X, Y, Z, S, T, U, and V is set to 1, and the flow advances step S46 or S53.

In steps S46 to S52, the same operation as in steps S14 to S25 in the above embodiment (FIG. 11) is performed.

On the other hand, if the sheet is in the landscape direction and the image direction is 90° or 270° (T=1 or V=1) the portrait format image is selected in step S53, and the flow advances to step S54. If the image direction is 0° or 180° (S=1, U=1), the landscape format image is selected, and the flow advances to step S58.

In step S54, whether the image direction is 90° or 270° is checked. If the image direction is 90°, the flow advances to step S55 to read out the format image by rotating it 90°. If the image direction is 270°, the flow advances to step S56 to read out the format image by rotating it 270° (−90°). In step S57, the original image and the rotated format image are synthesized, and the flow advances to step S62.

In step S58, whether the image direction is 0° or 180° is checked. If the image direction is 0°, the flow advances to step S59 to read out the format image by rotating it −90°. If the image direction is 180°, the flow advances to step S60 to read out the format image by rotating it 90°. In step S61, the original image and the rotated format image are synthesized, and the flow advances to step S62.

In step S62, the synthesized image is formed. If it is determined in step S63 that all images to be formed have not been completely formed, the flow returns to step S33. If it is determined in step S63 that all images to be formed have been completely formed, the operation ends.

As described above, a format image is selected and the rotational angle of the format image is determined in accordance with the image direction and the sheet direction of the original. Consequently, an original image can be automatically synthesized with an appropriate format image as shown in FIGS. 19 or 20.

Third Embodiment

In the first and second embodiments described above, synthesis image data stored in a storage means is read out in a direction suited to input image data. However, the present invention is not limited to the above embodiments. That is, image formation can also be performed by rotating an input image so that the input image is suited to a synthesis image by controlling the read of the input image.

The third embodiment of the present invention having the above arrangement will be described below. The basic configuration of the third embodiment is the same as the first embodiment described earlier except that a part of image processing executed by the image processor 206 shown in FIG. 2 under the control of the CPU 201 is different.

Figure 5:
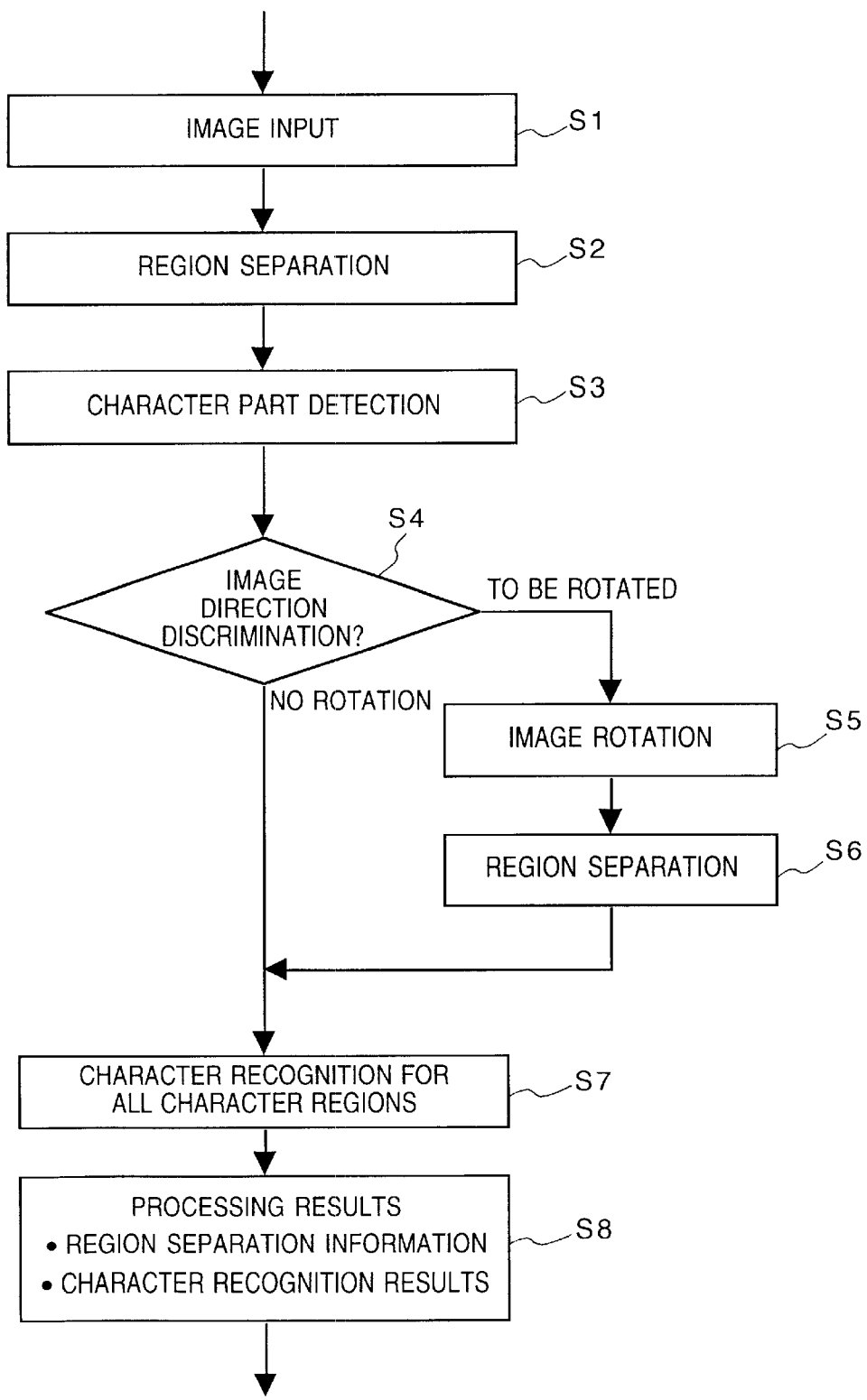
FIG. 5 is a flow chart showing automatic image direction discrimination and character recognition processing in this embodiment of the present invention.

That is, in this third embodiment, while the processing shown in FIG. 5 is executed to process input image data, the original direction is checked in step S4 on the basis of the image direction discrimination result from the image direction discriminating unit 306 shown in FIG. 3. If the image direction is not the regular direction, the flow advances to step S5 to rotate the input image so that the image data points in the regular direction. In this processing, the rotated image is stored in the memory 301 or the like, and this image and an image to be synthesized are synthesized.

Figure 11:
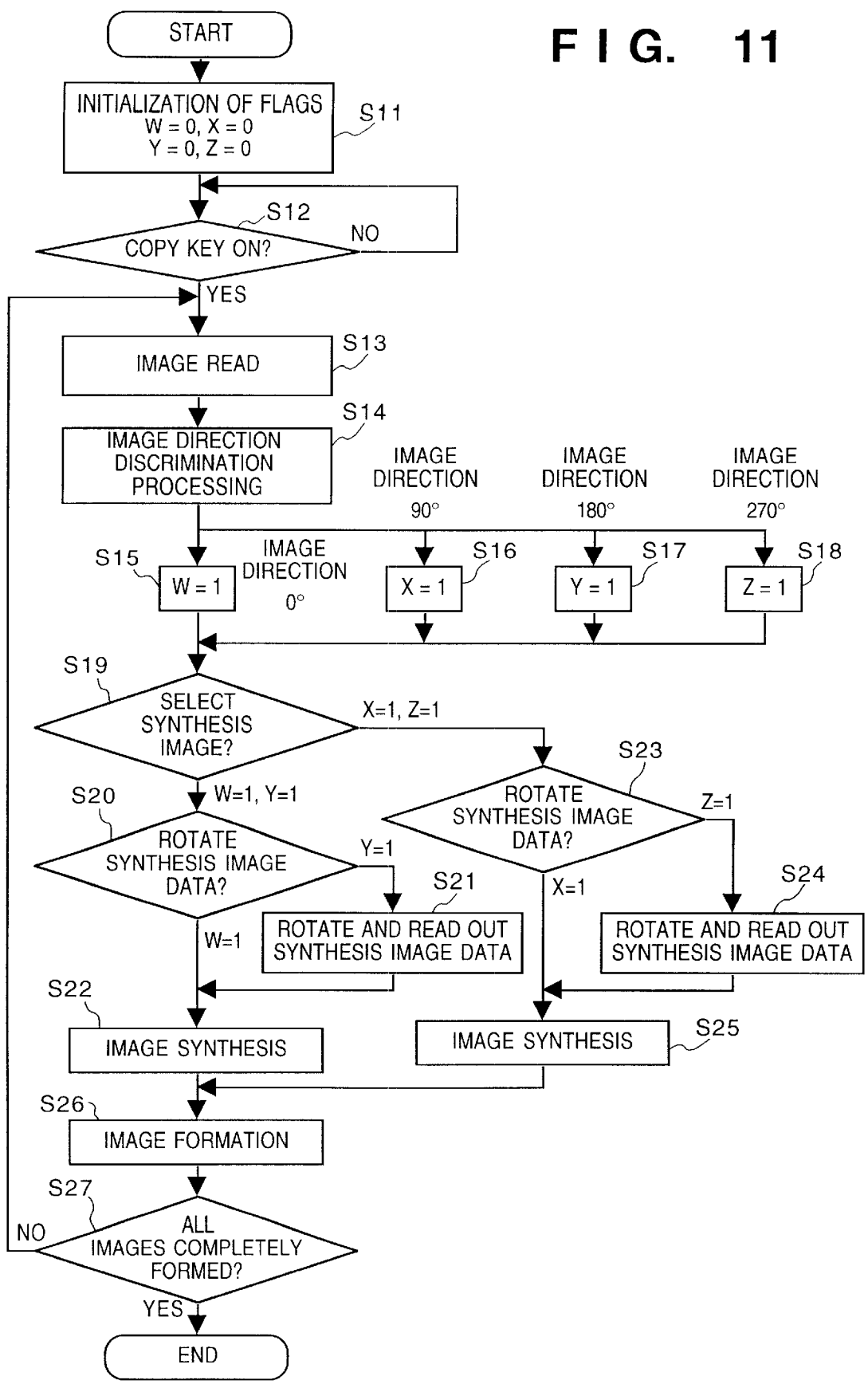
FIG. 11 is a flow chart showing image synthesis/output processing in this embodiment of the present invention.

Alternatively, in the processing in steps S20 and S23 of FIG. 11, whether an input image is to be rotated is checked instead of checking whether synthesis image data is to be rotated. In the processing in steps S21 and S24, the input image data is rotated and output instead of reading out the synthesis image data by rotating it.

With this control, image formation can be performed by rotating an input image so that the input image is suited to a synthesis image by controlling the read of the input image.

Other Embodiments

The present invention can be applied to a system constituted by a plurality of devices (e.g., host computer, interface, reader, printer) or to an apparatus (e.g., copying machine, a facsimile apparatus) comprising a single device.

Furthermore, the object of the present invention can also be achieved by providing a storage medium storing program codes for performing the aforesaid functions according to the embodiments to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Also, the storage medium, such as a floppy disk, a hard disk, an optical disk, a magneto-optical disk, a CD-ROM, a CD-R, a magnetic tape, a non-volatile type memory card, and a ROM can be used for providing the program codes.

Moreover, besides aforesaid functions according to the above embodiments are realized by executing the program codes which are read by a computer, the present invention includes a case where on OS (Operating System) or the like running on the computer performs a part or entire processes in accordance with instructions of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with instructions of the program codes and realizes functions of the above embodiments.

When the present invention is applied to the above storage medium, this storage medium stores program codes corresponding to the flow charts described previously.

As has been described above, the present invention can automatically discriminate and correct the direction of an original. Therefore, it is possible to provide an image forming apparatus capable of performing image formation without sorting originals including both portrait and landscape ones. Furthermore, it is possible to provide an image forming apparatus capable of performing image formation without setting originals in the same direction.

Accordingly, even in copying a plurality of originals including both originals to be synthesized on a portrait image data format and originals to be synthesized on a landscape image data format, a user can copy these originals without setting each original in the corresponding direction. Furthermore, even when different types of originals are to be copied, it is unnecessary to perform image synthesis by setting different conditions for different originals. Consequently, a readily usable image forming apparatus can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a memory, arranged to store at least a portrait type of format image and a landscape type of format image in advance, wherein both type of format images are presenting the same contents;
   an inputter, arranged to input an image;
   a discriminator, arranged to discriminate the direction of an input image input by said inputter;
   a selector, arranged to select a type of format image, based on the direction of the input image discriminated by said discriminator, of a plurality of format images including the portrait type of format image and the landscape type of format image stored in said memory which is to be synthesized with the input image; and
   a synthesizer, arranged to synthesize the input image and the type of format image selected by said selector.

2. The apparatus according to claim 1, wherein said selector selects the type of format image based on the direction of the input image from the format images stored in said memory, based upon whether the input image is a portrait type or landscape type of image.

3. The apparatus according to claim 2, wherein if the direction of the format image selected by said selector is shifted 180° from the direction of the input image, said synthesizer rotates the format image selected by said selector 180° and synthesizes the rotated format image with the input image.

4. The apparatus according to claim 2, wherein if the direction of the format image selected by said selector is shifted 180° from the direction of the input image, the input image is rotated 180° and synthesized with the format image selected by said selector.

5. The apparatus according to claim 1, wherein said inputter reads an original image.

6. The apparatus according to claim 1, further comprising an image former, arranged to form an image in accordance with a synthesized result of the input image and the portrait type of format image or the landscape type of format image selected by said selector, by said synthesizer.

7. The apparatus according to claim 1, wherein said discriminator discriminates the direction of the input image by discriminating of the direction of a character in the input image.

8. The apparatus according to claim 1, further comprising an original sheet direction detector, arranged to detect the sheet direction of an original,
   wherein said selector selects the portrait type of format image or the landscape type of format image stored in said memory based on the sheet direction of the original and the direction discriminated by said discriminator.

9. An image processing method comprising the steps of:
   inputting an image;
   discriminating a direction of an input image input in said inputting step;
   selecting a type of format image, based on the direction of the input image discriminated in said discriminating step, from a plurality of format images including a portrait type of format image and a landscape type of format image previously stored in a memory, which is to be synthesized with the input image, wherein the portrait type of format image and the landscape type of format image present the same contents; and
   synthesizing the input image and the type of format image selected in said selecting step.

10. The method according to claim 9, wherein said selecting step includes selecting the portrait type or the landscape type of format image from the plurality of format images stored in the memory based upon whether the input image is a portrait type or landscape type of image.

11. The method according to claim 10, wherein if the direction of the format image selected in said selecting step is shifted 180° from the direction of the input image, said synthesizing step includes rotating the selected format image 180° and synthesizing the rotated image with the input image.

12. The method according to claim 10, wherein if the direction of the format image selected in said selecting step is shifted 180° from the direction of the input image, the input image is rotated 180° and synthesized with the selected format image.

13. The method according to claim 9, wherein said inputting step includes reading an original image.

14. The method according to claim 9, further comprising the step of forming an image in accordance with a synthesis result obtained in said synthesizing step.

15. The method according to claim 9, wherein said discriminating step includes discriminating the direction of the input image in said input step by discriminating a character in the input image.

16. The method according to claim 9, further comprising the step of detecting a sheet direction of an original,
   wherein said selecting step includes selecting a portrait type of format image and a landscape type of format image from the plurality of format images stored in the memory based upon the sheet direction of the original and the direction of the input image.

17. A format image determination method for determining a format image to be synthesized with an input image of a plurality of format images including a portrait type of format image and a landscape type of format image stored in a memory, the method comprising the steps of:
   discriminating a direction of the input image; and
   determining a type of format image, based on the direction of the input image discriminated in said discriminating step, of a plurality of format images including the portrait type of format image and the landscape type of format image stored in a memory as a format image is to be synthesized with the input image.

18. The method according to claim 17, further comprising the steps of:
- synthesizing the input image and the type of format image determined in said determining step; and
- forming an image synthesized in said synthesizing step on a recording sheet.

19. The method according to claim 17, further comprising the step of performing an image rotating process to make the direction of the input image and the direction of the type of format image determined in said determining step unity, in a case where the direction of the input image and the direction of the type of format image determined in said determining step are not equal.

20. The method according to claim 17, wherein the input image is inputted by using a reader for reading an original.

21. The method according to claim 17, wherein the plurality of format images include a portrait type of format image and a landscape type of format image which are presenting the same contents.

* * * * *